Patented May 5, 1942

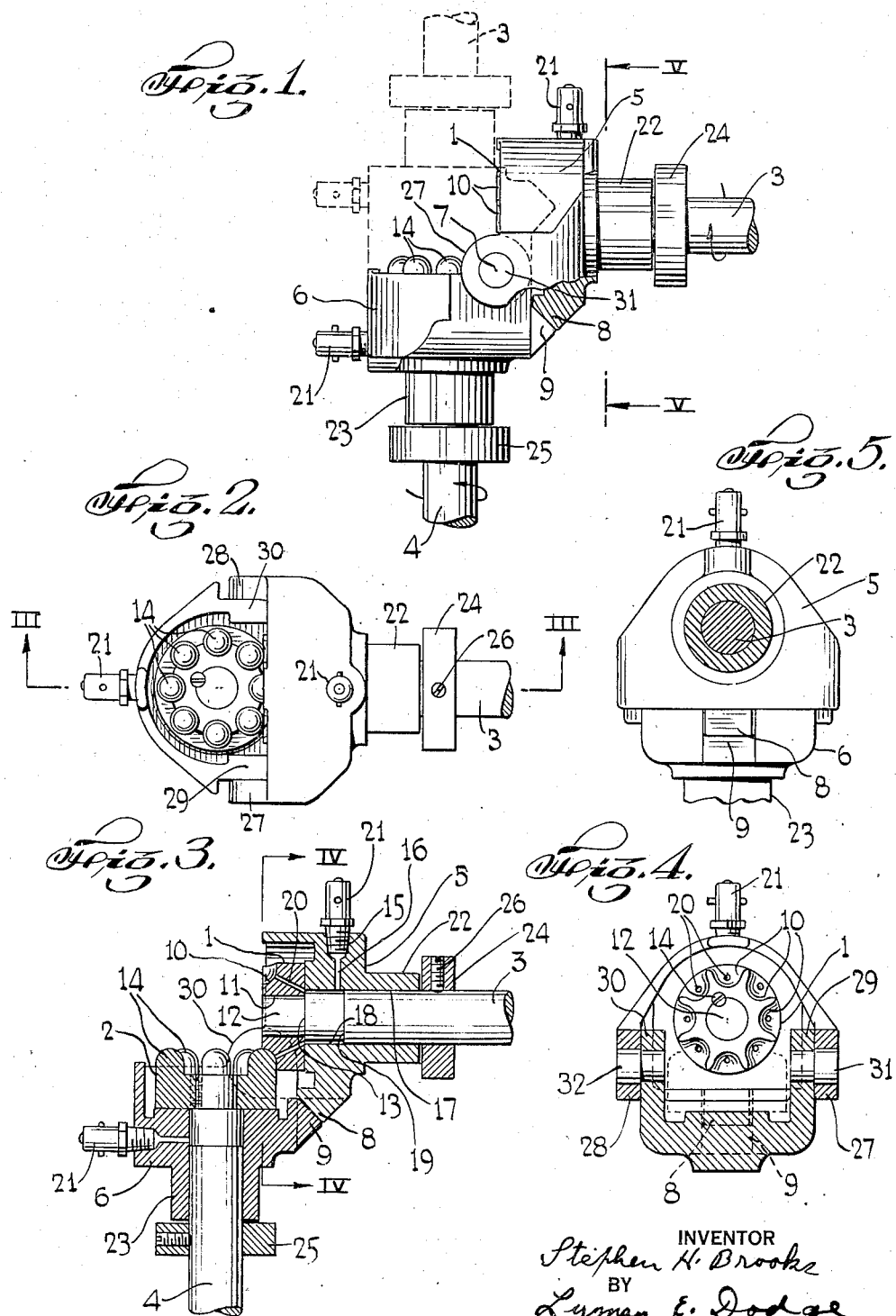

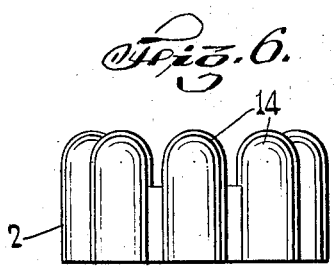
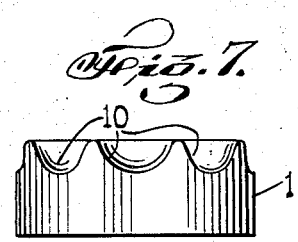
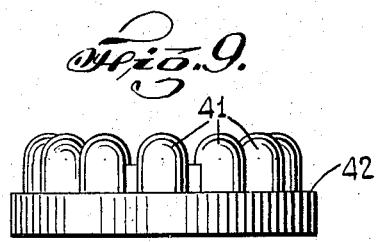
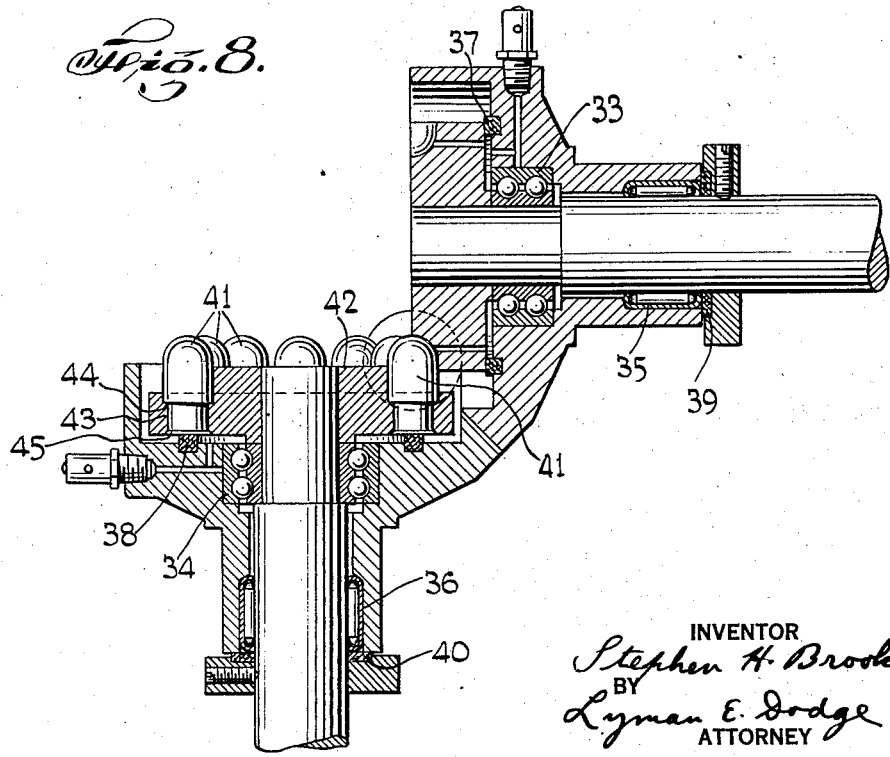

2,281,913

UNITED STATES PATENT OFFICE

REISSUED
OCT 24 1944

2,281,913

POWER TRANSMISSION MEANS

Stephen H. Brooks, New York, N. Y., assignor to Brooks Equipment Corporation, New York, N. Y., a corporation of New York Application August 21, 1940, Serial No. 353,476

3 Claims. (Cl. 74—468)

This invention relates to machine elements, particularly coupling elements, and more especially power transmission means.

A principal object of this invention is the production of a device of the type specified which is so constructed that all parts may be easily, sufficiently, and properly lubricated.

A further object of the invention is the provision of a device of the type specified which will be simple in construction, readily built, easily installed and maintained, and durable and efficient in operation.

Further objects and advantages will appear as the description of the invention and the particular physical embodiments selected to illustrate the invention progresses, and the novel features will be particularly pointed out in the appended claims.

In describing the invention in detail, and the particular physical embodiments selected to illustrate the invention, reference will be had to the accompanying drawings and the several views thereon, in which, like characters of references designate like parts throughout the several views, and in which:

Fig. 1 is a side elevational view, with some parts broken away to more clearly illustrate the construction and different possible positions of some parts shown by dotted lines, of a device embodying the invention; Fig. 2 is a top plan view of the device as shown in Fig. 1; Fig. 3 is a sectional view on the plane indicated by the line III—III of Fig. 2, viewed in the direction of the arrows at the ends of the line; Fig. 4 is a sectional view on the plane indicated by the line IV—IV of Fig. 3, viewed in the direction of the arrows at the ends of the line; Fig. 5 is a cross sectional view on the plane indicated by the line V—V of Fig. 1, viewed in the direction of the arrows at the ends of the line; Fig. 6 is a side elevation of a ball gear usable with the invention; Fig. 7 is a side elevation of a socket gear; Fig. 8 is a cross sectional view, corresponding to the cross sectional view Fig. 3, of a modified form of the invention; Fig. 9 is a view, corresponding to Fig. 6, of a ball gear usable with the modified form of the invention as shown by Fig. 8.

The interconnecting or driving and driven parts of my invention, as illustrated in Figs. 1 to 7 inclusive, are the members 1 and 2, one of which, say 1, is attached to a shaft 3 which is driven in any suitable or appropriate manner and causes, by its motion, a movement of member 2 and so of shaft 4 attached thereto.

Shaft 3 is journaled in a housing 5, and shaft 4 is journaled in a housing 6.

The housings 5 and 6 are pivoted one on the other so as to be oscillatable about the axis 7 so that the shafts 3 and 4 may take various angular positions one to the other through an arc of 90 degrees in the plane of the drawing paper and in all other planes passed through and including the longitudinal axis of shaft 4. One extreme of the arc is occupied by the shaft 3, as shown in full lines in Fig. 1, and the other by the dotted line position of shaft 3 in the same figure. The extreme position in one direction, the full line position of shaft 3 in Fig. 1 is determined by the engagement of limiting stops 8 and 9, one on housing 5 and the other on housing 6. The limiting position at the other extreme is preferably determined by the engagement of the edges of the housings 5 and 6.

A preferred construction for pivoting one housing on the other into form mating ears, in pairs, as 27 and 28 on housing 5 and ears 29 and 30 on housing 6. Each ear is orificed and pivot pins 31 and 32 are positioned in the orifices.

The socket member 1 is, preferably, substantially a disc with a plurality of sockets, 10, in the form shown, 8, formed in its outer, or mating face, at the edge thereof. This socket member 1 is preferably formed with a through orifice 11 into which extends the reduced end 12 of the shaft 3, the socket member seating against the shoulder 13. The socket member 1 is preferably retained in place on shaft 3 by means of the headless screw 14.

The ball member 2 is positioned and retained on shaft 4, preferably, in an exactly similar manner to the way in which socket member 1 is mounted and retained on shaft 3. This ball member 2 has, in general, the form of a disc having positioned about its periphery, a plurality, in this case, 8, teeth 14, each terminative in a head, which is hemispherical or globular.

The proportioning of the parts is such that the hemispherical heads 14 fit and mesh with the reversely formed sockets 10 of the socket member 1 so that a rotative movement of either causes a rotative movement of the other.

The housing 5 is formed with a screw threaded cavity 15, continued by a small bore duct 16 terminating at the inside surface of the bore or orifice 17 in which the shaft is positioned. The shaft 3 is reduced in diameter from the mouth of the duct 16 to the shoulder 19, thus forming an annular duct. The annular duct 18 connects with a plurality of ducts 20, each terminating in a socket depression 10. Lubricant may be forced into duct 16 and so to each of the socket depressions 10 so that these may be well lubricated at all times. To conveniently do this, the commonly used fitting 21, known as an Alemite fitting, may be preferably employed. By the means shown, not only the socket depression 10, well lubricated but also, the contacting surfaces of the socket member and the housing 5 and also the journal for shaft 3.

Housing 6 is similarly constructed to housing 5 to lubricate the shaft 4 and the bearing surface between the member 2 and housing 6.

As it may be necessary to, at times, position one or the other of the housings 5 or 6, each is formed with cylindrical protuberance, as 22 and 23. One or the other of these may be grasped by a stationary stirrup and so held. To assist in the positioning of the housing in the stirrup, a collar, as 24 and 25, is adjustably positioned on each of the shafts 3 and 4. This collar is held in adjusted position by any suitable means, as by a set screw, as 26.

Fig. 8 illustrates a modified form of physical embodiment of the invention adapted for transmitting a larger force. In this form, the general arrangement is the same as is the form shown by Figs. 1 to 5 inclusive.

In the form illustrated by Fig. 8, radial thrust bearings, 33 and 34 have been installed to reduce friction. Needle bearings 35 and 36 have also been included. The lubricant ducts have been slightly altered to properly conduct the lubricant to the various surfaces. Annular felt 37 and 38 has been positioned to prevent undue escape of lubricant between the gears and the housings, and felt 39 and 40 has been interposed between the collars and the end of the housings to prevent escape of lubricant at such points. The driving teeth 41 corresponding to the teeth 14 of Fig. 3 have been made as a separate part and inserted in disk 42 in orifices, as 43, formed therein. The teeth are held in place in any suitable or appropriate manner, the construction shown includes cooperating shoulders at 44 and a headed end 45.

Although one particular physical embodiment of my invention and one modification only thereof has been described, nevertheless, it is desired to have it understood that the forms selected are merely illustrative and do not exhaust the possible physical embodiments of the idea of means underlying the invention.

What is new and desired to secure by Letters Patent of the United States is:

1. In a lubricated shaft and gear, including, in combination: a housing formed with an orifice for receiving a shaft; a shaft positioned in the orifice; a gear attached to the end of the shaft, said gear formed with ducts, said shaft formed with a reduced portion adjacent to and extending to the gear, and communicating with one end of the ducts; means to lead lubricant to said reduced portion extending to the gear face whereby lubricant may then pass through the through ducts in said gear.

2. In a lubricated shaft and gear, including, in combination: a housing formed with an orifice for receiving a shaft; a gear in the housing; a shaft in the orifice of the housing and attached to the gear and extending without the housing; means, including an annular space formed by reducing the shaft, and ducts in the gear whereby lubricant is directed through the gear.

3. In a lubricated shaft and gear, including, in combination: a housing formed with an orifice for receiving a shaft; a gear in the housing; a shaft in the orifice of the housing and attached to the gear and extending without the housing; means, including an annular space surrounding the shaft, and ducts in the gear whereby lubricant is directed through the gear.

STEPHEN H. BROOKS.